(12) United States Patent
Kuo et al.

(10) Patent No.: US 7,409,673 B2
(45) Date of Patent: Aug. 5, 2008

(54) XML DOCUMENT EDITOR

(75) Inventors: Yue-Sun Kuo, Taipei (TW); Jaspher Wang, Taipei (TW); Nai-Cheng Shih, Taipei (TW)

(73) Assignee: Academia Sinica, Taipei (TW)

( * ) Notice: Subject to any disclaimer, the term of this patent is extended or adjusted under 35 U.S.C. 154(b) by 806 days.

(21) Appl. No.: 10/601,521

(22) Filed: Jun. 24, 2003

(65) Prior Publication Data

US 2004/0268304 A1  Dec. 30, 2004

(51) Int. Cl.
*G06F 9/44* (2006.01)
*G06F 17/00* (2006.01)
*G06F 17/10* (2006.01)

(52) U.S. Cl. .................. 717/112; 717/126; 708/420; 708/421; 708/440; 715/126; 715/112

(58) Field of Classification Search .................. None
See application file for complete search history.

(56) References Cited

U.S. PATENT DOCUMENTS

| | | | |
|---|---|---|---|
| 6,523,172 B1* | 2/2003 | Martinez-Guerra et al. | 717/143 |
| 2002/0198876 A1* | 12/2002 | Zielinski et al. | 707/4 |
| 2003/0033589 A1* | 2/2003 | Reyna et al. | 717/109 |
| 2003/0154444 A1* | 8/2003 | Tozawa et al. | 715/513 |
| 2004/0006744 A1* | 1/2004 | Jones et al. | 715/514 |
| 2004/0177321 A1* | 9/2004 | Brown et al. | 715/513 |
| 2004/0239674 A1* | 12/2004 | Ewald et al. | 345/440 |
| 2006/0026505 A1* | 2/2006 | Mani et al. | 715/513 |
| 2006/0168519 A1* | 7/2006 | Torii et al. | 715/523 |

OTHER PUBLICATIONS

D. D. Cowan, E. W. Mackie, G. M. Pianosi, "Rita-an editor and user interface for manipulating structured documents", p. 125-150, 1991, Electronic Publishing, vol. 4(3).*
Anne Bruggemann-Klein, "Regular Expressions into Finite Automata", p. 1-17, Theoretical Computer Science 1993.*
Kuo, Wang, and Shih, "Handling Syntatic Constraints in a DTD-Compliant XML Editor", p. 222-224, 2003 ACM.*

* cited by examiner

*Primary Examiner*—Mary Steelman
(74) *Attorney, Agent, or Firm*—Bacon Thomas, PLLC

(57) ABSTRACT

A DTD-compliant XML document editor is disclosed. The XML document editor generates hints for required elements and required element slots automatically in the process of document creation and edition so as to guide the user to produce a valid document, while syntactic violations are avoided at the same time. The editor also suggests optional elements that may be added into the document to be edited. The user requires no knowledge about XML and DTD to edit DTD-compliant XML documents. The editing process is user-interface-neutral, being able to support user interfaces based on tree views, presentation views and forms. By combining the DTD-compliant editing process with the simplicity of forms, a simple XML document editor with forms as its user interface is developed.

5 Claims, 3 Drawing Sheets

XML DOCUMENT EDITOR

FIELD OF INVENTION

The present invention relates to an XML document editor, especially to an XML document editor that generates documents complying with a given DTD or schema.

BACKGROUND OF THE INVENTION

Extensible markup language (XML) is a new generic representation for data and documents. It has emerged as a standard for information exchange over the network. Moreover, many application domains have developed DTD (Document Type Definition) or schema-based XML vocabularies for their data and documents to be coded in XML and processed by standard software packages. XML thus has great impact on all these application domains.

Fundamental to XML applications is the creation and editing of XML documents. This is evidenced by the large number of commercial and public-domain XML editors released so far. An XML document editor (hereinafter referred to as "XML editor") allows its user to produce either well-formed and/or syntax valid XML documents. Such an XML editor typically maintains a well-formed working document and provides validity checking upon the user's request. The user has all the freedom to edit the document. To ensure the document to be valid, the user must check for validity and correct the syntactic violations in the document reported by the validity checker. This requires the user's knowledge about the DTD or schema of the document. Another approach to relieve the user from syntactic concerns is to provide extensive customization specific to XML vocabularies. However, this requires the intervention of a technical expert.

XML editors in use today typically support the so-called context-sensitive editing. While a user is editing a document, the system provides guidance or hints regarding what the user can do next so as to produce a valid document eventually. This policy is helpful. However, the guidance or hints these XML editors provide are typically too loose to guarantee the validity of the resulting document. That becomes a major reason why these XML editors need a validity checker.

Current XML editors appear to differ more in their user interfaces than their underlying editing methodologies and, thus, may be classified into 4 types according to their user interface. They are: user interfaces based on text views, tree views, presentation views and forms. Some systems support multiple types of user interfaces. A text view XML editor allows the user to edit tags as in a text editor. A tree view editor displays the hierarchical structure of an XML document as a tree and provides operations for inserting and deleting tree nodes. A presentation view applies some kinds of transformations, including XSLT, CSS and proprietary ones, to an XML document in order to present a "WYSIWYG" user interface to its user. A presentation view specific to a vocabulary typically requires customization and support by technical experts.

A form-based XML editor is essentially a form generator based on a data model specified by an XML schema (or DTD). Current form-based XML editors are not robust enough to handle general XML data, not to mention their ability to avoid syntactic violations upon data entry.

These XML editors do not enforce syntactic constraints strictly during document construction and provide validity checking as warning/hints for correcting syntactic violations among other typically inaccurate context-sensitive guidance and hints. These XML editors allow users to create and edit both well-formed and valid XML documents in a single editing mode.

OBJECTIVES OF THE INVENTION

An objective of this invention is to provide an XML document editor dedicated to generating XML documents complying with a given DTD or schema.

Another objective of this invention is to provide an XML document editor such that syntactic violations against applicable DTD or schema may be avoided.

Another objective of this invention is to provide an XML document editor that is able to generate accurate guidance and hints to users in the process of document creation.

Another objective of this invention is to provide an XML document editor to simplify users' document creation or edition process.

Another objective of this invention is to provide an XML document editor with which an user does not need to be a technical expert to create or edit an XML document.

Another objective of this invention is to provide an XML document editor that is able to support user interface of various types.

Another objective of this invention is to provide an XML document editor that is able to support a form-based user interface.

SUMMARY OF THE INVENTION

According to the present invention, a DTD-compliant XML document editor is disclosed. The XML document editor generates hints for required elements and required element slots automatically in the process of document creation and edition so as to guide the user to produce a valid document, while syntactic violations are avoided at the same time. The editor also suggests optional elements that may be added into the document to be edited. The user requires no knowledge about XML and DTD to edit DTD-compliant XML documents. The editing process is user-interface-neutral, being able to support user interfaces based on tree views, presentation views and forms. By combining the DTD-compliant editing process with the simplicity of forms, a simple XML document editor with forms as its user interface is developed.

These and other objectives and advantages of this invention may be clearly understood from the detailed description by referring to the following drawings.

DETAILED DESCRIPTION OF THE INVENTION

The purpose of this invention is to provide a DTD-compliant XML document editor that has the following unique features:

First, the editor allows the user to edit XML documents without the violation of syntactic constraints given by the applicable DTD (document type definition) or schema, whereby the user does not need to correct any syntactic violations.

Secondly, the editor generates hints for elements and element slots (placeholders for the user to add elements) automatically when it detects that they are required to make the current document valid.

Third, the editor generates optional element slots upon the user's request. Elements and element slots are generated in response to the user's addition of elements.

Last but not least, the DTD-compliant document editor does not require the user's knowledge about XML. The user only needs to know the application-specific meaning of elements and attributes in an XML vocabulary.

Glushkov Automata

An XML document has a nested multi-level hierarchical structure. For the purpose of syntactic validity, it is possible to consider the syntactic constraint imposed on each element and its child elements separately. The content type of an element is defined by a regular expression (to be explained in details hereinafter), which determines the valid sequence of occurrences of its child element types. Here, the notation of DTD is adopted to express regular expressions.

Although it is not intended to limit the scope of this invention, the XML editor of this invention may be supported by the theory of automata. A regular expression E over a finite alphabet of symbols $\Sigma=\{x_1, x_2, \ldots, x_n\}$ is simple if each symbol $x_i$ appears in E only once. The language L specified by E can be recognized by a deterministic finite automaton (DFA) G, known as the Glushkov automaton, defined as follows:

(1) Every symbol of $\Sigma$ is a state of G. G has two additional states s and f as its start and final states, respectively. (If L contains the empty string, s is also a final state.)

(2) The transition function $\delta(x_i, x_j)=x_j$ for any $x_i\epsilon\Sigma$ and $x_j\epsilon follow(x_i)$, i.e. $x_j$ immediately follows $x_i$ in some string in L.

$\delta(s, x_j)=x_j$ for any $x_j\epsilon first(E)$, i.e. $x_j$ is the first symbol in some strings in L.

$\delta(x_i, \$)=f$ for any $x_i\epsilon last(E)$, i.e. $x_i$ is the last symbol in some strings in L, where $ is a special end symbol appended to every string.

Figure 1:
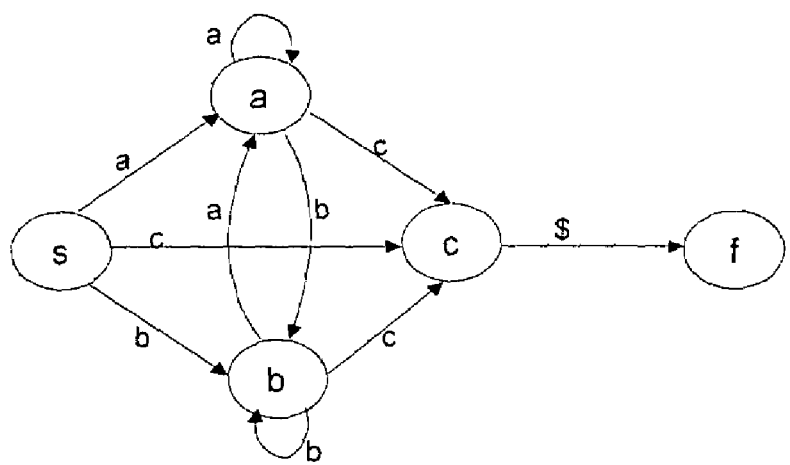
FIG. 1 shows the Glushkov automaton for regular expression E, E=((a|b)*, c).

Note that the functions first(E), last(E) and follow($x_i$) can be computed easily by traversing the tree structure of E once. Take the simple expression $E=((a|b)^*, c)$ as an example. We have first(E)={a,b,c}, last(E)={c}, follow(a)=follow(b)={a,b,c}, and follow(c)={ }. The Glushkov automaton G for E is as shown in FIG. 1.

Edges in the Glushkov automaton G are of several types: If states E1 and E2 are two subexpressions of E in sequence, i.e. (E1, E2) is a subexpression of E, then G contains a sequence edge (u,v) for every $u\epsilon last(E1)$ and every $v\epsilon first(E2)$. (A regular expression E has a natural tree representation. A subexpression of E corresponds to a subtree of the tree representation of E.) Sequence edges and edges from the start state s and edges to the final state f are referred to as forward edges collectively. If E1* is a subexpression of E, then G contains an iteration edge (u,v) for every $u\epsilon last(E1)$ and every $v\epsilon first(E1)$. In general, an edge may be a sequence edge as well as an iteration edge. An iteration edge that is not a sequence edge is referred to as a backward edge. For the DFA G in FIG. 1, edges (a,c) and (b,c) are sequence edges as well as forward edges. Edges (s,a), (s,b), (s,c) and (c,f) are forward edges. Edges (a,a), (a,b), (b,a), and (b,b) are iteration edges as well as backward edges.

For a subexpression E1 of E, let A(E1) denote the set of symbols in $\Sigma$ that E1 includes. For instance, if $E1=(a|b)^*$, then A(E1)={a,b}. Let reachable(u) denote the set of states in G reachable from state u, i.e. reachable(u)={z|there exists a path in G from u to z}. A forward path is a path only consisting of forward edges. Let f-reachable(u) denote the set of states in G reachable from u through forward edges, i.e. f-reachable(u)={z|there exists a forward path in G from u to z}. With these definitions, we can make the following observations.

Lemma 1. The forward edges in G form no cycles.

Proof: We can label all symbols in E such that the labels are in increasing order from left to right. The forward edges are always from symbols at lower orders to symbols at higher orders. Thus they cannot form cycles.

Lemma 2. Let E1 be a subexpression of E. For any $x\epsilon A(E1)$, there exists some $u\epsilon first(E1)$ and $v\epsilon last(E1)$ such that $x\epsilon f\text{-reachable}(u)$ and $v\epsilon f\text{-reachable}(x)$.

Proof: The lemma is trivial if E1 is a symbol. It is sufficient to prove the lemma on the basis that the child subexpressions of E1 satisfy the lemma. There are three cases:

(1) E1 is an iteration, i.e. $E1=E2^*$ for some subexpression E2, which satisfies the lemma. Since A(E1)=A(E2), first(E1)=first(E2), and last(E1)=last(E2), E1 satisfies the lemma as E2 does.

(2) E1 is a choice, i.e. E1=(E2|E3), where E2 and E3 satisfy the lemma. For any $x\epsilon A(E1)$, we have either $x\epsilon A(E2)$ or $x\epsilon A(E3)$, say $x\epsilon A(E2)$. (The case for $x\epsilon A(E3)$ is symmetric.) Since E2 satisfies the lemma, there exists some $u\epsilon first(E2)$ and $v\epsilon last(E2)$ such that $x\epsilon f\text{-reachable}(u)$ and $v\epsilon f\text{-reachable}(x)$. Since first(E1)=first(E2)$\cup$first(E3)$\supseteq$first(E2) and last(E1)=last(E2)$\cup$last(E3) $\supseteq$last(E2), we have proven the lemma for E1.

(3) E1 is a sequence, i.e. E1=(E2, E3), where E2 and E3 satisfy the lemma. For any $x\epsilon A(E1)$, we have either $x\epsilon A(E2)$ or $x\epsilon A(E3)$, say $x\epsilon A(E2)$. (The case for $x\epsilon A(E3)$ is similar.) Since E2 satisfies the lemma, there exists some $u\epsilon first(E2)$ and $z\epsilon last(E2)$ such that $x\epsilon f\text{-reachable}(u)$ and $z\epsilon f\text{-reachable}(x)$. Since first(E2)$\subseteq$first(E1), we have $u\epsilon first(E1)$. Since E3 satisfies the lemma, there exists some $w\epsilon first(E3)$ and $v\epsilon last(E3)\subseteq last(E1)$ such that $v\epsilon f\text{-reachable}(w)$. Since E1=(E2, E3), there is an edge from z to w. We have found a forward path from x to z, w, and finally $v\epsilon last(E1)$, which completes the proof for the lemma.

Lemma 3. Let E1* be a subexpression of E. Then for any two symbols u and v in A(E1), we have $v\epsilon reachable(u)$ and $u\epsilon reachable(v)$.

Proof: From Lemma 2, there exists x1, $x2\epsilon first(E1)^*$ and z1, $z2\epsilon last(E1)^*$ such that $u\epsilon f\text{-reachable}(x1)$, $z1\epsilon f\text{-reachable}(u)$, $v\epsilon f\text{-reachable}(x2)$ and $z2\epsilon f\text{-reachable}(v)$. On the other hand, there exists a iteration edge from z2 to x1 and a iteration edge from z1 to x2. We have found a cycle connecting x1, u, z1, x2, v, z2, and back to x1. This completes the proof.

The Glushkov automata above are for simple regular expressions. For a general regular expression E' over a finite alphabet of symbols $\Sigma'=\{y_1, y_2, \ldots, y_m\}$ where a symbol may appear 2 or more times in the expression, one can map E' to a simple regular expression E over an alphabet $\Sigma=\{x_1, x_2, \ldots, x_n\}$ by renaming each occurrence of symbol $y_i\epsilon E'$ as a distinct symbol $x_j\epsilon\Sigma$. Let origin($x_j$)=$y_i$ denote the original symbol $y_i$ that $x_j$ represents. Let G be the Glushkov automaton constructed above for E. One can construct the Glushkov automaton G' for E' from G by replacing all labels $x_j$ on edges in G by origin($x_j$).

For instance, for the regular expression E'=((a|b)*, a), E' can be mapped to the simple regular expression E=((a|b)*, c) by renaming the second occurrence of a in E' to c. The Glushkov automaton G' for E' can then be constructed from the Glushkov automaton G shown in FIG. 1 by replacing the label c on all edges in G by label a. The Glushkov automata G and G' are so similar that one can do all computations on G and map the results to G' for a general regular expression E' at the end.

DTD-Compliant XML Editor

Let E' be a regular expression over the alphabet of symbols $\Sigma'=\{y_1, y_2, \ldots, y_m\}$ and E its associated simple regular expression over alphabet $\Sigma=\{x_1, x_2, \ldots, x_n\}$. Also let G and G' be the Glushkov automata for E and E', respectively, as constructed above. Assume that E' is used as the content model of an element type. It is apparent that a valid document corresponds to a path in G from s to f, and vice versa. In other words, if a path in G from s to f is found, a valid document may be established.

An XML editor with the goal of producing a "valid document" at the end cannot guarantee to produce a valid document during the process of the creation and edition of the document. However, the XML editor of this invention produces "DTD-compliant" documents during their creation and edition at all times. In a DTD-compliant document, the child elements of a parent element form a subsequence of a valid "child element sequence". Take the regular expression (a?, b, (c, d)+, e) as an example. The string, acdde, is not valid but is DTD-compliant since it is a subsequence of the string, abcd-cde, which is valid.

Using a DTD-compliant editor, a user starts with an empty document and makes element additions under the control of the system so that the working document is always DTD-compliant. A user can delete an arbitrary element from the working document; the resulting document is still DTD-compliant apparently. A user iterates the process of element addition and deletion so as to complete a desirable valid XML document eventually. A DTD-compliant document corresponds to a sequence $\{z_1, z_2, \ldots, z_p\}$ of states in G where $z_1=s$, $z_p=f$, and $z_{i+1} \in$ reachable($z_i$), $1 \leq i \leq p-1$. The document seen by the user is the sequence $\{origin(z_2), origin(z_3), \ldots, origin(z_{p-1})\}$. The main issue is, when the user intents to insert an element between a pair of consecutive states (elements), say $z_i$ and $z_{i+1}$, how to compute an appropriate set of candidate states (elements) for the user to select from so that the insertion of the selected element results in a DTD-compliant document.

As a result, the major function of the present invention is to determine how a DTD-compliant element may be inserted between a pair of consecutive states during the edition of the XML document. In making such a determination, it does not mean that the XML editor of this invention checks all the elements of the current document to determine whether all of them are DTD-compliant or that, during or after the edition of the document, all elements of the document comply with the applicable DTD.

Candidate State Set

Figure 2:
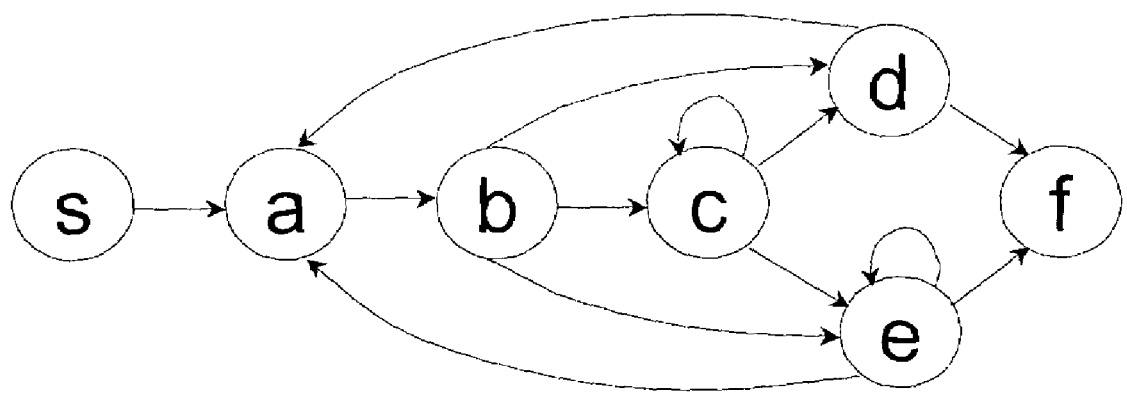
FIG. 2 shows the Glushkov automaton for regular expression E=(a, b, c*, (d|e+))*.

Consider the candidate state set C for an element slot to be inserted between two states u and v where v∈reachable(u). A candidate state set is a representation of the "possible" paths for connecting u to v. A necessary condition for a state z between u and v in C is to satisfy z C reachable(u) and v∈reachable(z). However, this condition is not sufficient. Consider the Glushkov automaton G for the regular expression E=(a, b, c*, (d|e+))* as shown in FIG. 2. Due to the outer iteration of E, every state is reachable from every other state (except s and f). If states in C just had to satisfy the necessary condition, C would contain all states in any case. Such a necessary condition is too loose to give accurate suggestions. The concept of "minimal" candidate state set that does not involve cycles and detours (e.g. unnecessary backward edges) in general is thus adopted in this invention. The minimal candidate state set presumes a "direct path" or "direct paths" from u to v. Cycles are allowed in a candidate state set only in restricted cases. The following lemma characterizes "direct" paths from u to v.

Lemma 4. Let u and v be states in G for which v∈reachable (u). Assume v∉f-reachable(u). Then there exists a subexpression E1* of E to include u and v such that w∈f-reachable(u) for some w∈last(E1) and v∈f-reachable(z) for some z∈first (E1). This establishes an acyclic path P connecting u to v. (If the subexpression E1* is chosen to be the smallest subexpression to include u and v, such a path P is referred to as a minimal backward path.)

Proof: Let E2 be the smallest subexpression of E to include both u and v. Assume to the contrary that E2 and all its ancestors are not iteration subexpressions, i.e. they are sequence or choice subexpressions. Consider any ancestor E3 of E2. E3 may only induce forward edges from states in its left subexpression to states in its right subexpression. However, both u and v are covered by one of its subexpression. Thus the forward edges induced by E3 have nothing to do with whether v is (forward) reachable from u. In other words, whether v is (forward) reachable from u depends on E2.

If E2 is a choice subexpression, since u and v are covered by the two subexpressions of E2, respectively, u cannot reach v, which is a contradiction. In the case that E2 is a sequence subexpression where E2=(E3, E4), there are two cases: If u∈E4 and v∈E3, then u cannot reach v, which is a contradiction. If u∈E3 and v∈E4, then u can reach v through forward edges by applying Lemma 2 to both E3 and E4, which is also a contradiction. We have derived contradictions in all cases. Thus there must exist an iteration subexpression E1* including both u and v. From Lemma 2, there exists w∈last(E1) such that w∈f-reachable(u), and z∈first(E1) such that v∈f-reachable (z). Since (w,z) is an iteration edge, a path P connecting u to v is found.

To prove that P is acyclic, assume to the contrary that P visits a state p more than once. Since the subpaths connecting u to w and z to v, respectively, are forward paths, p appears on each subpath only once. Now the two subpaths connecting u to p and p to v form a forward path connecting u to v. This contradicts the assumption v∉f-reachable(u). Thus P is acyclic.

Policies for Finding Candidate States

To find out possible paths between two elements in a DTD-compliant document, the XML editor of this invention provides two policies, as follows:

Policy FindCandidateStates1:

Given two states u and v where v C reachable(u) and (u,v)∉H (H is the edge set of G), FindCandidateStates1 computes the candidate state set C for possible elements inserted between u and v. C is composed of the intermediate states in the acyclic paths from u to v determined by Lemma 4. (If the user wants a path with cycles, an acyclic path may be established first followed by cycles as Policy FindCandidateStates2 supports.)

Policy FindCandidateStates1(u,v)//(u,v)∉H

IF v∈f-reachable(u) THEN

C={x∈Σ|x∈f-reachable(u) and v∈f-reachable(x)}
ELSE
   let E1* be the smallest iteration subexpression of E that covers both u and v
   C={x∈A(E1)|x∈f-reachable(u) or v∈f-reachable(x)}
ENDIF Policy FindCandidateStates1 allows the user to add a minimal set of elements between u and v in order to render the current document valid locally. Now refer to FIG. 2 again. The state pair (a,e) satisfies e∈f-reachable(a). Thus we have C={b,c}. For the state pair (c, a), a is not reachable from c through forward edges. c must reach a through d or e. Thus, we have C={d,e}.

Policy FindCandidateStates2:

Given two states u and v where v∈reachable(u) and (u,v)∈H, FindCandidateStates2 computes a candidate state set C. Here (u,v) can be a forward edge, an iteration edge or both. If (u,v) is a forward edge, C is first computed as in FindCandidateStates1. On the other hand, if u is the end or v is the beginning of an iteration or (u,v) is a backward edge, a new iteration can be inserted between u and v by adding its symbols to C.

Policy FindCandidateStates2(u,v)//(u,v)∈H
IF (u,v) is a forward edge THEN
   C={x∈Σ|x∈f-reachable(u) and v∈f-reachable(x)}
   IF u∈last(E1*) for some iteration subexpression E1* of E, and let E1 be the largest one, THEN
      C1={x∈A(E1)|v∈f-reachable(x)}
      C=C∪C1
   ENDIF
   IF v∈first(E2*) for some iteration subexpression E2* of E, and let E2 be the largest one, THEN
      C2={x∈A(E2)|x∈f-reachable(u)}
      C=C∪C2
   ENDIF
ELSE /*(u,v) is a backward edge */
   let E3* be the largest iteration subexpression of E satisfying u∈last(E3) and v∈first(E3)
   C=A(E3)
ENDIF Consider the Glushkov automaton G in FIG. 2. For the state pair (a,b), we have C={ }, which indicates no element should be inserted between a and b. For the state pair (b,d), we have C={c}. For the state pair (b,c), since c∈first(c*), we have C={c}, which allows the user to iterate c. For the state pair (c, c), which is a backward edge, we have C={c}. The user can add an iteration c between the two iterations. For the state pair (e,f), since e∈last(e*) and e∈last(E) while E is the outer iteration, we have C={a,b,c,d,e}. The user may want to add the inner iteration or the outer iteration. The system provides the user with all possibilities.

With the candidate state set C⊆Σ calculated as above, the system computes the candidate element list C', where C'={y∈Σ'|y=origin(x) for some x|C}, for the user to select from. When the user selects an element y from C', y is mapped back to an element occurrence x∈C for insertion into the current document.

Hints for "Required Elements" and "Required Element Slots"

In order to minimize the user's workload of element additions, the XML editor of this invention generates hints of "required elements" automatically upon the addition of an element. An element is deemed "required" if it is present in all valid documents containing the current document. This policy certainly applies to the empty document at initial stage, too.

Consider the regular expression (a, (b, c)?). At initial stage, a is a required element. Once element b (or c) is entered, c (or b) becomes a required element.

Since a required element is one that is present in all valid documents containing the current document, a required element between u and v corresponds to a state z through which all paths from u to v pass. Such a state is known as a cut-vertex or articulation point. It is possible to apply a maximum flow-like operation to find the articulation points separating u and v, i.e. to find the required elements between u and v. When there are multiple articulation points, the maximum flow-like operation is executed repeatedly.

The XML editor of this invention generates not only hints for elements but also hints for "element slots" for the user to fill in. Given two consecutive elements in the current document, if (u,v)∉H where H is the edge set of G, then every valid document containing the current document contains at least one element between the two consecutive elements, a hint of element slot between the two elements is automatically generated. Such element slots may be called as "required element slots" since the user should typically provide appropriate elements for these placeholders in order to render the current document valid. While generating an element slot, the editor also generates an associated candidate state set C using Policy FindCandidateStates1. The user must fill in an element slot by selecting from its candidate element list C' a desired element.

Consider an element with its content defined by regular expression (a, (b|c)). While the system generates the required element a, it also generates a required element slot following a, together with a candidate element list containing b and c for the user to select.

It should be noted that the XML editor of this invention generates hints for required element slots only when the current document is not yet valid. When the user has filled up all required element slots and the system generates no more required element slots, the current document becomes "valid".

"Optional Element Slots"

In additional to generating hints for required elements and required element slots automatically, the XML editor of this invention generates hints for "optional elements" or "optional element slots" upon the user's requests. According to the XML editor of this invention, when a user wishes to add an element spontaneously, it is not necessary to point to the exact position for insertion. The user selects an existing element as a reference position (e.g. highlighted) and asks the system to generate hints for all possible elements at positions close to the reference position. These hints are referred to as "optional element slots" and the elements to be filled into the slots "optional elements". Given two states u and v where v∈reachable(u) and (u,v)∈H, the editor computes the candidate state set C using Policy FindCandidateStates2, and generates an optional element slot between u and v if C is not empty. The user can then fill in optional element slots in the same way as in the required element slots.

Consider the regular expression (a,b)+. Initially, the system generates a and b as required elements, which results in the state sequence sabf. Applying Policy FindCandidateStates2 to each pair of consecutive states, the resulting candidate state sets are: C={ } for the pair (a,b) and C={a,b} for the pairs (s,a) and (b,f). Thus the system generates an optional element slot between s and a, and one between b and f but none between a and b.

It should be noted that element slots are placeholders for elements rather than real elements. Conceptually they are entities displayed on the user interface rather than something in the working document. The XML editor of this invention can remove optional element slots from the user interface upon the user's request.

Form-Based User Interface

The DTD-compliant XML document editor of this invention can be considered as a user-interface-neutral process layer below the user interface layer. Different types of user interfaces can be implemented on top of this process layer. The invented XML editor appears suitable especially for supporting user interfaces based on tree views, presentation views and forms. A form-base user interface according to the XML document editor of this invention is illustrated as the embodiment of this invention, without limiting the scope of this invention, as follows.

Figure 3:
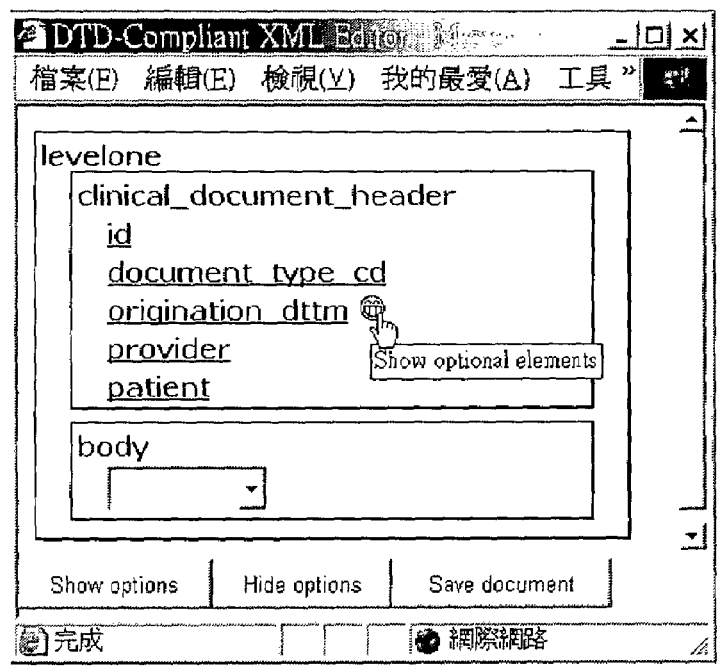
FIG. 3 illustrates the top-level form of the user interface of an embodiment of the XML document editor of this invention.

In this embodiment, the CDA DTD_is taken as example to demonstrate the form-based user interface of the DTD-compliant XML document editor of this invention. FIG. 3 shows the top-level form when an empty document is created. This form displays two levels of elements: levelone has two required child elements clinical_document_header and body; clinical_document_header has 5 required child elements. body contains a required element slot as its child for the user to fill in. These hints of required elements and required element slots are generated by the system automatically. The system has a parameter LEVEL_LIMIT that determines the number of levels of elements a form may contain. An element at the bottom level in a form appears as a hyperlink if it may have child elements. One can click it to display a child form that shows its child (and grandchild, etc.) elements. A child form may have child forms again so that child forms may nest indefinitely.

Note that if LEVEL_LIMIT is large, the form has essentially a tree view. It is believed that tree views with deep structures are hard conceptually and confusing visually for ordinary users. Thus LEVEL_LIMIT is typically set to a small number so that the form appears more like a conventional form than a tree view. Of course, anyone skilled in the art may adjust the depth of nested forms by setting LEVEL__LIMIT to an appropriate value. This is important for a form-based XML editor, which lacks a global structural picture of the XML document.

Figure 4:
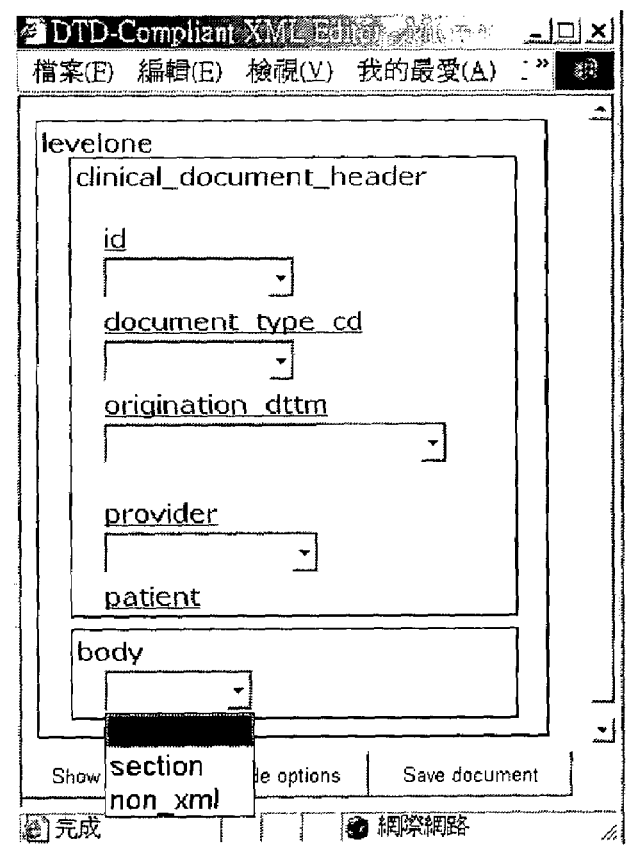
FIG. 4 illustrates the screen display of optional element slots of the user interface of the XML document editor of this invention.

As shown in FIG. 3, each form has two buttons for displaying and hiding all optional element slots, respectively. An alternative way is to display optional element slots only around a selected element. When one moves the pointer over an element, a small OPTIONAL icon pops up following the element in the same row as shown in the figure. If the user clicks the icon, the optional element slots around the current element are displayed as shown in FIG. 4. Here the bound of neighbors is 2. Thus at most 2 optional element slots are displayed preceding (following) the current element. On the other hand, if the user does not click OPTIONAL and moves the pointer out of the current element, the OPTIONAL icon pops off immediately.

Figure 5:
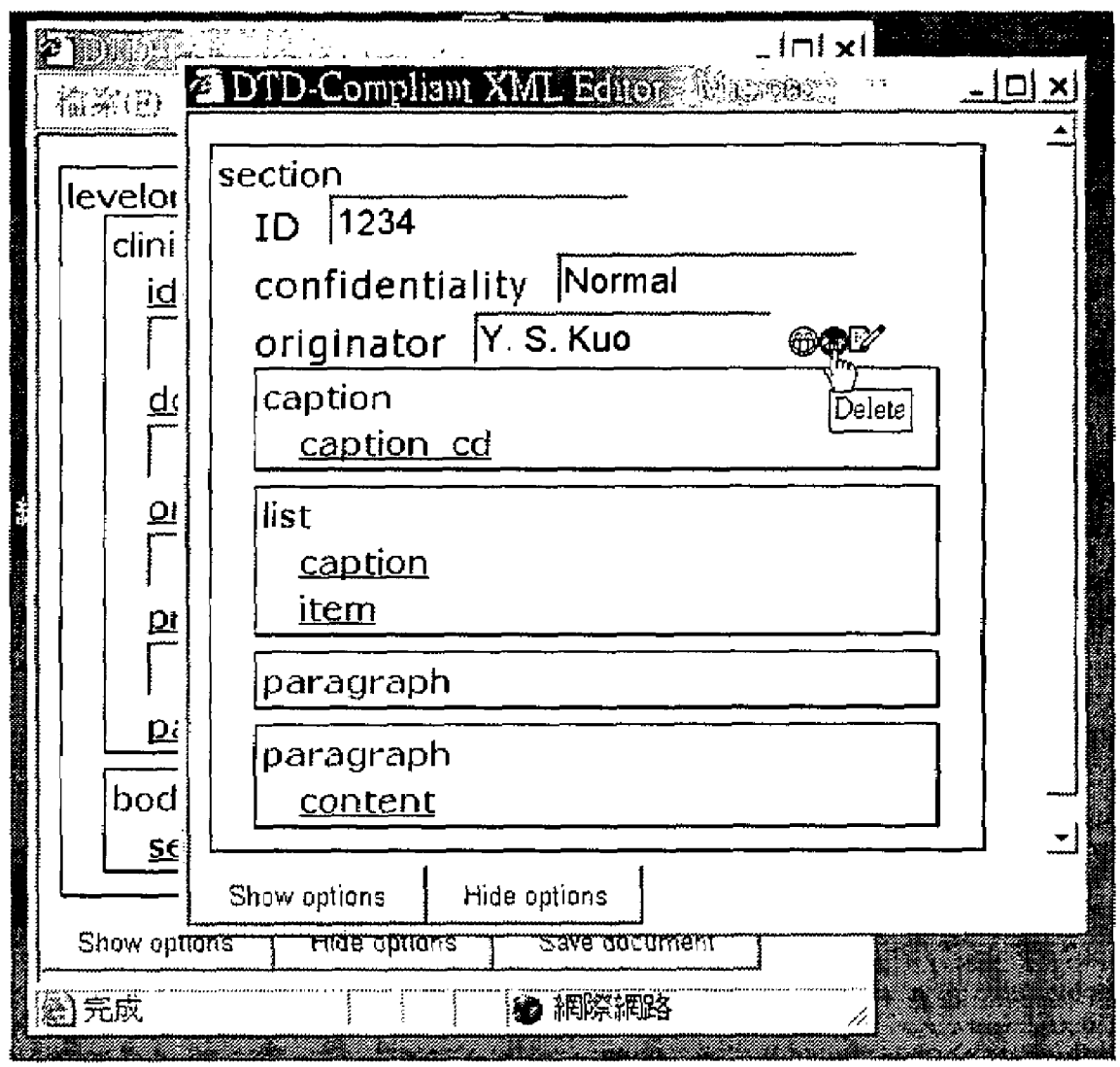
FIG. 5 illustrates the nest form of the user interface of the XML document editor of this invention.

Also shown in FIG. 4, the user can fill in an element slot by selecting from a menu of candidate elements generated by the system. Suppose that, in this case, the user has selected the element section. By clicking section to display a new child form, the user is allowed to work on section's child and grandchild elements. FIG. 5 shows a scenario where the user has added a few attributes and child elements to the section element. Attributes and child elements form two groups with attributes preceding child elements.

As shown in FIG. 5, when the user moves the pointer over an element or attribute, three small icons, OPTIONAL, DELETE and CHANGE, may pop up following the element or attribute in the same row. By clicking DELETE (CHANGE), the user can remove the current element or attribute (change the tag of the current element).

The user interface of the DTD-compliant editor of this invention supports a level-limited tree view so as to represent the flexible and dynamic structure of XML documents. It frees the user from any syntactic concerns and generates element slots for the user to fill in. Such a form-based XML editor can also serve as a form generator based on an XML data model.

It should be noted that the DTD-compliant XML document editor of this invention is user interface-neutral, being able to support document structure-independent layouts as well.

EFFECTS OF THE INVENTION

The XML editor of this invention allows the user to create and edit DTD-compliant XML documents, while syntactic violations are avoided. The XML editor generates hints for required elements and required element slots automatically in the creation and edition of documents so as to guide the user to produce valid documents. The editor also generates optional element slots upon the user's request. As a consequence, the user's major work is simply to fill in element slots by selecting candidate elements from system-generated a list. The user requires no knowledge about XML and DTD to edit DTD-compliant XML documents.

The invented XML document editor is user-interface-neutral, being able to support user interfaces based on tree views, presentation views and forms. In particular, by combining the DTD-compliant process with the simplicity of forms, a simple XML editor with forms as its user interface is provided. Such a form-based XML editor can also serve as a form generator based on an XML data model.

Using the DTD-compliant XML editor of this invention, a user's action is in principle under the control of the system but the system does not over-constrain the user. The user can select any element from a candidate element list. Elements do not have to be added in a certain order. DTD-compliance is not a strict constraint indeed. On the other hand, since the user's action is under the control of the system, a user can never violate the syntactic constraints. Consequently users don't have to be aware of the syntax of the document.

As the present invention has been shown and described with reference to preferred embodiments thereof, those skilled in the art will recognize that the above and other changes may be made therein without departing form the spirit and scope of the invention.

What is claimed is:

1. Method for enabling a user to edit an XML document using an XML document editor to add or delete an element into a working document and to convert said working document into an XML document file; comprising the step of enabling said XML document editor to automatically generate, in relation to two consecutive elements $z_i$ and $z_{i+1}$ of said working document, a list of candidate third elements z to be provided to a user; wherein said third elements z in said list are selected such that relations between elements $z_i$ and z and between elements z and $z_{i+1}$ comply with said Document Type Definition (DTD) of said working document after said element z is inserted between elements $z_i$ and $z_{i+1}$, said list enabling the user to select any of the candidate third elements z and add them to the working document without affecting DTD compliance of the working document, wherein whether the relation between two consecutive elements complies with said DTD is determined according to the following rule:

suppose G is Glushkov Automaton of said document, $z_i$ is a state in G, $1 \leq i \leq p-1$, $p \in N$, $\Sigma = \{z_1, z_2, \ldots z_p\}$ is a sequence of states in G where $z_1 = s$, s is start state of G, $z_p = f$, f is final state of G;

if $z_{i+1} \in$ reachable($z_i$), wherein reachable($z_i$) denote the set of states in G reachable from state $z_i$, then the relation between $z_i$ and $z_{i+1}$ is determined compliant with DTD of said document.

2. The method according to claim 1, wherein a cell C to include said candidate third element z is generated according to the following rule and displayed as a list:

suppose $(z_i, z_{i+1}) \in H$, H denotes the set of edges in G, G is Glushkov Automaton of regular expression E corresponding to an element of said working document;

further suppose $\Sigma$ is a set to include states corresponding to all elements of G, A(E1) is the set of states in subexpression E1 to E, f-reachable($z_i$) denotes the set of states in G reachable from $z_i$ through forward edges;

if $z_{i+1} \in$ f-reachable($z_i$), then let $C = \{z \in \Sigma | z \in$ f-reachable($z_i$) and $z_{i+1} \in$ f-reachable(z)$\}$;

if $z_{i+1} \in$ f-reachable($z_i$), then let E1* be the smallest iteration subexpression of E that covers both $z_i$ and $z_{i+1}$, $C = \{z \in A(E1) | z \in$ f-reachable($z_i$) or $z_{i+1} \in$ f-reachable(z)$\}$.

3. The method according to claim 1, wherein a cell C to include said candidate third elements z is generated according to the following rule and displayed as a list:

suppose $(z_i, z_{i+1}) \in H$, H denotes the set of edges in G, G is Glushkov Automaton of regular expression E corresponding to an element of said working document;

further suppose $\Sigma$ is a set to include states corresponding to all elements of G, A(E1) is the set of states in subexpression E1 to E, f-reachable($z_i$) denotes the set of states in G reachable from $z_i$ through forward edges;

if $(z_i, z_{i+1})$ is a forward edge, let $C = \{z \in \Sigma | z \in$ f-reachable($z_i$) and $z_{i+1} \in$ f-reachable(z)$\}$ and:

if $z_i \in$ last(E1*) for some iteration subexpression E1* of E and E1 is the largest one, then let $C1 = \{z \in A(E1) | z_{i+1} \in$ f-reachable(z)$\}$, $C = C \cup C1$;

if $z_{i+1} \in$ first(E2*) for some iteration subexpression E2* of E and E2 is the largest one, then let $C2 = \{z \in A(E2) | z \in$ f-reachable($z_i$)$\}$ and $C = C \cup C2$;

if $(z_i, z_{i+1})$ is a backward edge, then let $C = A(E3)$, wherein E3* is the largest iteration subexpression of E satisfying $z_i \in$ last(E3) and $z_{i+1} \in$ first(E3).

4. The method according to claim 1, further comprising automatically generating a required element between element pair $z_i$ and z and element pair z and $z_{i+1}$ after said third element z is inserted between element pair $z_i$ and $z_{i+1}$, such that said working document is compliant with said DTD; wherein said requirement comprises articulation points between elements $z_i$ and z (and z and $z_{i+1}$) in Glushkov Automaton G; i.e., states through which all paths between $z_i$ and z (and z and $z_{i+1}$) shall pass.

5. The method according to claim 1, further comprising automatically generating an element slot allowing user to add elements into said document, if no required element between element pair $z_i$ and z and element pair z and $z_{i+1}$ is found after said third element z is inserted between element pair $z_i$ and $z_{i+1}$ and if $(z_i, z) \in H$ ($(z, z_{i+1}) \in H$), wherein H denotes set of edges in G; and wherein said requirement comprises articulation points between elements $z_i$ and z (and z and $z_{i+1}$) in Glushkov Automaton G; i.e., states through which all paths between $z_1$ and z (and z and $z_{i+1}$) shall pass.

* * * * *